United States Patent

Sunaga et al.

[11] Patent Number: 5,808,419
[45] Date of Patent: Sep. 15, 1998

[54] OPERATING SECTION DISPLAY UNIT OF AIR CONDITIONING SYSTEM FOR VEHICLE USE

[75] Inventors: Hideki Sunaga; Masatoshi Suto, both of Tokyo, Japan

[73] Assignee: Calsonic Corporation, Tokyo, Japan

[21] Appl. No.: 812,764

[22] Filed: Mar. 6, 1997

[30] Foreign Application Priority Data

| Mar. 6, 1996 | [JP] | Japan | 8-048966 |
| Mar. 6, 1996 | [JP] | Japan | 8-048975 |
| Mar. 6, 1996 | [JP] | Japan | 8-048976 |

[51] Int. Cl.⁶ ........................................... G09G 3/10
[52] U.S. Cl. .................. 315/169.1; 315/294; 315/307; 345/47; 345/75
[58] Field of Search ............... 315/169.1, 169.3, 315/169.4, 224, 294, 307; 345/47, 75, 102

[56] References Cited

U.S. PATENT DOCUMENTS

| 4,358,713 | 11/1982 | Senoo et al. | 315/169.1 X |
| 4,968,917 | 11/1990 | Harris | 315/307 X |
| 5,563,622 | 10/1996 | Person et al. | 345/75 |

*Primary Examiner*—Benny Lee
*Assistant Examiner*—Justin P. Bettendorf
*Attorney, Agent, or Firm*—Sughrue, Mion, Zinn, Macpeak & Seas, PLLC

[57] ABSTRACT

In the middle of the grid signal wire connecting the grid terminal of the clock drive IC with that of the clock fluorescent display tube, the illumination control circuit is arranged, wherein in accordance with the illumination control signal, the illumination control circuits converts the first grid input signal and the second one by the ½ duty signal into the first grid output signal and the second one by a pulse signal, the pulse width of which is changed according to the illumination control signal.

17 Claims, 11 Drawing Sheets

FIG. 3 (a)

FIRST GRID INPUT SIGNAL

FIG. 3 (b)

SECOND GRID INPUT SIGNAL

FIG. 3 (c)

PULSE SIGNAL

FIG. 3 (d)

TRIANGULAR WAVE SIGNAL
SMOOTHED SIGNAL

BY THE
ILLUMINATION
CONTROL SIGNAL

FIG. 3 (e)

ON/OFF SIGNAL

FIG. 3 (f)

FIRST GRID OUTPUT SIGNAL

WIDTH IS ADJUSTABLE

FIG. 3 (g)

SECOND GRID OUTPUT SIGNAL

FIG. 5
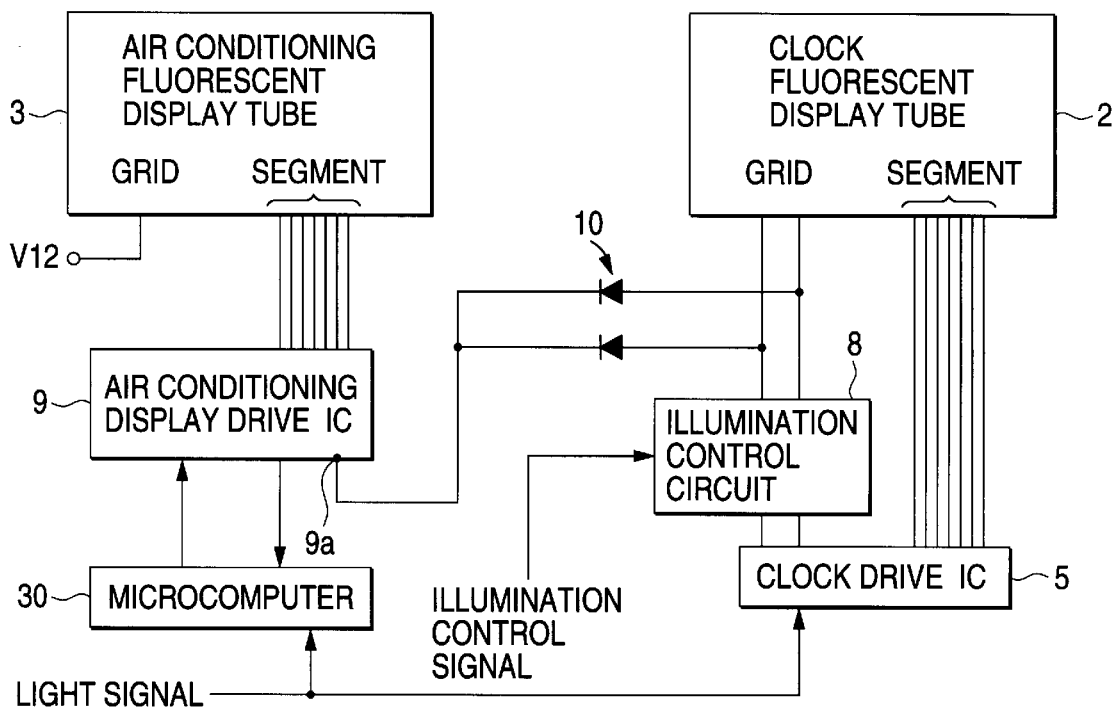
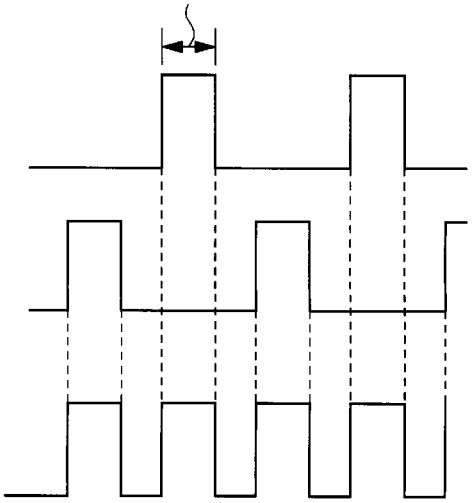
FIG. 6 (a)  FIRST GRID OUTPUT SIGNAL
FIG. 6 (b)  SECOND GRID OUTPUT SIGNAL
FIG. 6 (c)  BLANK INPUT SIGNAL (GRID TUNING SIGNAL)

FIG. 10 (a)
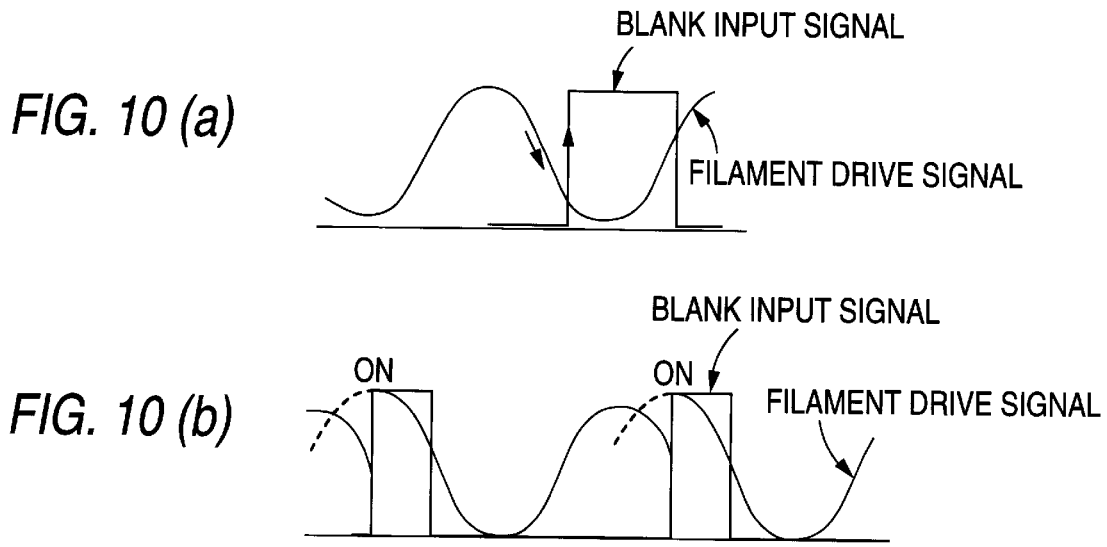
FIG. 10 (b)
FIG. 11
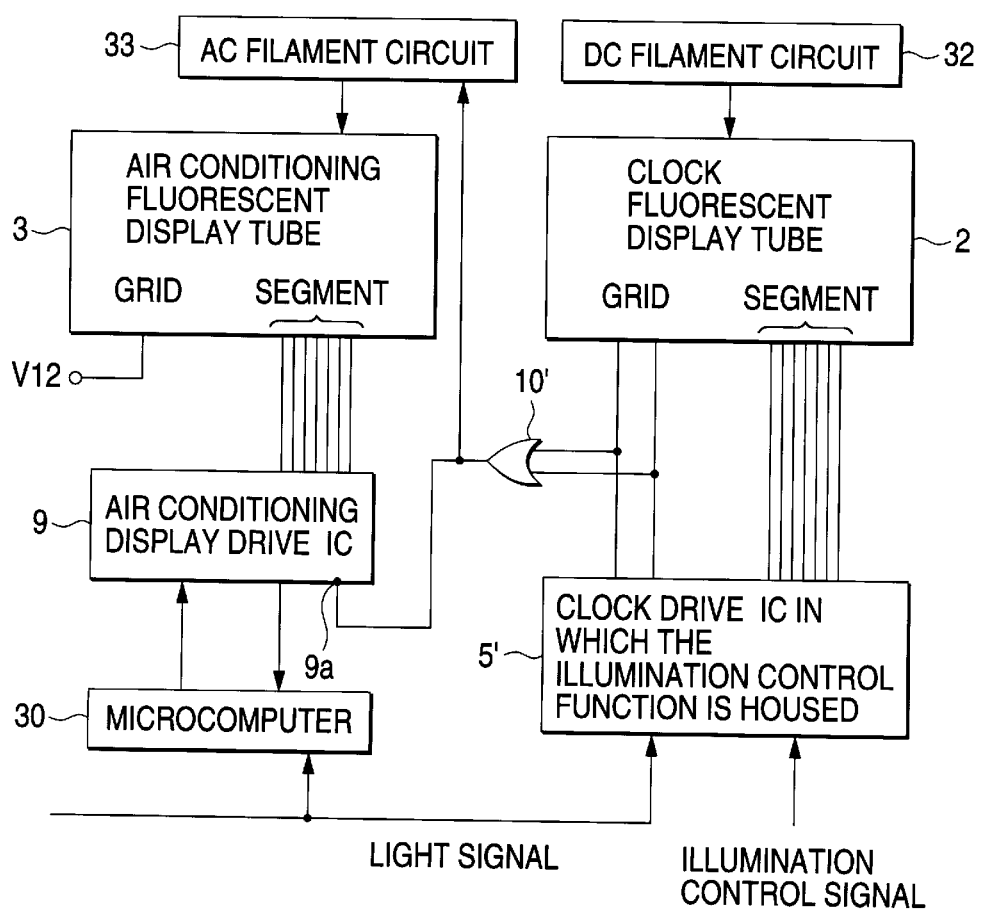

OPERATING SECTION DISPLAY UNIT OF AIR CONDITIONING SYSTEM FOR VEHICLE USE

BACKGROUND OF THE INVENTION

1. Field of the Invention

The present invention relates to a technical field of controlling illumination of a display unit arranged together with switches and other parts in an operating section of an air conditioning system for vehicle use.

2. Description of the Prior Art

When the duty VFD drive IC of a fluorescent display tube by duty drive in an operating section display unit of an air conditioning system for vehicle use has no stepless illumination control function, it is necessary to arrange a control circuit differently from the duty VFD drive IC so as to provide an illumination control function to the duty VFD drive IC.

A common method to provide this illumination control function is described as follows. As illustrated in FIG. 12, an illumination control signal sent from the illumination controller is directly inputted into a blank input terminal of the ½ duty VFD drive IC as shown by a solid line in FIG. 12. Alternatively, a signal frequency is modulated and inputted into a blank input terminal of the ½ duty VFD drive IC as shown by a dotted line FIG. 12. Either of the above two methods may be selected.

After a light switch has been turned on, the illumination control operation is conducted. Then, in accordance with an illumination control signal to be outputted, illuminance of the back light and display luminance of the ½ duty drive VFD are adjusted synchronously with each other.

In this case, luminance of ½ duty drive VFD is adjusted when a signal, in which a grid signal made by the ½ duty VFD drive IC and an illumination control signal to be inputted are superimposed on each other, is outputted from the ½ duty VFD drive IC into the ½ duty drive VFD.

In this connection, VFD (Vacuum Fluorescent Display) is a flat type electronic tube for displaying a numeral, character or mark when a fluorescent body emits light. A cathode of VFD is composed of a tungsten filament, and an anode of VFD is composed of segments expressing a numeral, character or mark. An electron current from the cathode to the anode is turned on and off by the action of a grid.

However, in the above operating section display unit of an air conditioning system for vehicle use of the prior art, the following problems may be encountered.

(1) When the illumination control signal is directly inputted into the blank input terminal of the ½ duty VFD drive IC, beats are generated by the illumination control signal and the grid signal. Therefore, a display of the ½ duty drive VFD is swayed.

The reason of occurrence of beats is described below. The illumination control signal is an oscillating signal, the frequency of which is determined by an oscillator, for example, the frequency of which is determined to be 250 Hz. On the other hand, the grid signal is an oscillating signal, the frequency of which is peculiar to the ½ duty VFD drive IC, for example, in the case of clock drive IC, the frequency is 256 Hz which is a multiple of 2. Therefore, when signals, the frequencies of which are a little different from each other, are superimposed, the signal wave-forms are shifted from each other. As a result, beats occurs.

(2) When an illumination control signal is inputted into the blank input terminal of the ½ duty VFD drive IC after the signal frequency of the illumination control signal has been modulated, a keen sound is caused by inputting a grid signal of high frequency into the ½ duty drive VFD.

The reason is described as follows. When the occurrence of beats is suppressed by the modulation of frequency, in order to give a large frequency difference with respect to the grid signal having a specific frequency, it is necessary to modulate an illumination control signal inputted into the ½ duty VFD drive IC to a high frequency region (KHz level). Therefore, as shown by the signal wave-forms of the grids 1 and 2 illustrated in FIG. 12, a signal, in which an illumination control signal oscillating at a high frequency is superimposed on the duty wave-form, becomes a grid signal sent to the ½ duty drive VFD.

Further, as another example of an air conditioning system operating section for vehicle use, when the clock fluorescent display tube by duty drive and an air conditioning fluorescent display tube by static drive are arranged adjacent to each other in the display section, in order to provide an illumination control function by which the illuminance of the back light in the operating section and the display luminance of both fluorescent display tubes in the display section are adjusted synchronously with each other by conducting an illumination control operation after the light switch has been turned on, as illustrated in FIG. 13, an illumination control signal sent from the illumination controller is inputted into both the clock drive IC and the air conditioner display drive IC.

However, in the above operating section display unit of an air conditioning system for vehicle use of the prior art, the following problems may be encountered.

(3) The illumination control characteristic of the clock drive IC and that of the air conditioning display drive IC are different from each other. Accordingly, it is difficult to make the luminance of the clock fluorescent display tube coincide with the luminance of the air conditioning fluorescent display tube.

The reason is that the clock drive IC is a custom IC designed according to the use, in which no program processing is conducted.

On the other hand, the air conditioning display drive IC is designed as follows. For example, when an automatic control mode is selected, in order to keep the temperature in the cabin at a predetermined value, program processing is carried out so that an air quantity of the fan can be adjusted and the door can be changed over. In order to accomplish the above object, the air conditioning display drive IC is operated when a necessary command is inputted from a microcomputer. Accordingly, operation of the air conditioning display drive IC is affected by the interruption of the microcomputer. As a result, the luminance of the air conditioning fluorescent display tube is changed.

(4) The temperature characteristic of the clock drive IC and that of the air conditioning display drive IC are different from each other. Accordingly, there is caused a difference of luminance between the clock fluorescent display tube and the air conditioning fluorescent display tube when the temperature is changed.

The reason is that the clock drive IC is an accurate integrated circuit into which resonators to provide the piezoelectric effect of crystal are incorporated. Accordingly, the clock drive IC is stable even when the temperature is changed.

On the other hand, the air conditioning display drive IC is an inaccurate integrated circuit of a ceramic package. Therefore, the operating characteristic of the air conditioning display drive IC is changed when the temperature is changed.

SUMMARY OF THE INVENTION

An object of the present invention is to accomplish a fluorescent display having a high visibility while both the occurrence of beats and the occurrence of keen sounds are prevented, in an operating section display unit of an air conditioning system for vehicle use having an illumination control function by which the illuminance of the back light and the display luminance of the duty drive fluorescent display tube are adjusted synchronously with each other.

According to a first aspect of the invention, there is provided an operating section display unit of an air conditioning system for vehicle use comprising: a duty drive fluorescent display tube arranged in an operating section of an air conditioning system for vehicle use, the duty drive fluorescent display tube displaying a numeral, character or mark by radiation of a fluorescent body; a back light arranged on a reverse side of the operating section; a duty VFD drive IC to drive a grid and segment of the duty drive fluorescent display tube; illumination control means for outputting an illumination control signal of which frequency is determined by an oscillator, and an amplitude of which is changed in accordance with an illumination control operation, wherein an illuminance of the back light and a display luminance of the duty drive fluorescent display tube are adjusted synchronously with each other by the illumination control operation conducted after the back light is turned on; and an illumination control circuit for converting an IC side grid signal according to a duty signal into a VFD side grid signal according to a pulse signal, a pulse width of the VFD side grid signal being changed in accordance with the illumination control signal, the illumination control circuit being arranged between the duty VFD drive IC and the duty drive fluorescent display tube.

The mode of operation will be explained below.

When the illumination control operation is conducted after the light switch for the back light has been turned on, the illuminance of the back light and the display luminance of the duty drive fluorescent display tube are adjusted synchronously with each other.

The display luminance of the duty drive fluorescent display tube is adjusted when the IC side grid signal by the duty signal is converted into the VFD side grid signal by a pulse signal, the pulse width of which is changed in accordance with the illumination control signal, according to the illumination control signal in the illumination control circuit.

The occurrence of sway of display caused on the duty drive fluorescent display tube can be prevented in the following manner. The illumination control signal, which is an oscillating signal having a specific frequency, is inputted into the illumination control circuit and used as a signal to determine the pulse width of a pulse signal generated in this circuit. The VFD side grid signal is a pulse signal, the pulse width of which is adjustable at the same frequency as that of the IC side grid signal. Therefore, unlike a case in which the illumination control signal is inputted into the duty VFD drive IC in a blank condition, the occurrence of beats caused between the illumination control signal and the grid signal can be avoided. Therefore, the display on the duty drive fluorescent display tube is prevented from swaying.

The occurrence of keen sounds of the filament of the duty drive fluorescent display tube is prevented in the following manner. The frequency of the VFD side grid signal inputted into the duty drive fluorescent display tube is the same as the frequency of the IC side grid signal outputted from the duty VFD drive IC, and a signal of high frequency is not superimposed on the VFD side grid signal. Accordingly, unlike a case in which the illumination control signal is modulated to the high frequency side and inputted into the duty VFD drive IC in a blank condition, keen sounds are not caused in the filament of the duty drive fluorescent display tube.

Further, in the operating section display unit of an air conditioning system for vehicle use according to a first aspect of the invention, the illumination control circuit may include: an output timing pulse generating circuit for generating a pulse in accordance with an output timing of the IC side grid signal; a triangular wave forming circuit for forming a triangular wave at an interval of the pulses generated by the output timing pulse generating circuit; an F/V converting circuit for smoothing the illumination control signal by an average voltage; a comparison circuit for making an ON/OFF signal having an ON width and an OFF width determined by superimposing a triangle signal and a smoothed signal; and a grid ON/OFF circuit for generating a VFD side grid signal according to a pulse signal by the IC side grid signal and the ON/OFF signal.

The mode of operation will be explained as follows. The illumination control signal is inputted into the F/V conversion circuit and smoothed by the average voltage. On the other hand, in the triangular wave forming circuit, a triangular wave signal is formed at an interval of pulses generated in the output timing pulse generating circuit.

In the comparison circuit, an ON/OFF signal is generated which has an ON width and an OFF width determined by the superimposition of the triangular signal and the smoothed signal. In the grid ON/OFF circuit, a VFD side grid signal by the pulse signal is generated by the IC side grid signal and the ON/OFF signal.

According to a second aspect of the invention, there is provided an operating section display unit of an air conditioning system for vehicle use comprising: a duty drive fluorescent display tube arranged in an operating section of an air conditioning system for vehicle use; a static drive fluorescent display tube arranged at a position adjacent to the operating section; a back light arranged on a reverse side of the operating section; a duty VFD drive IC to drive a grid and segment of the duty drive fluorescent display tube; a static VFD drive IC to drive a segment of the static drive fluorescent display tube; illumination control means for outputting an illumination control signal of which frequency is determined by an oscillator, and an amplitude of which is changed in accordance with an illumination control operation, the illumination control signal being inputted only into a duty VFD drive IC side, wherein an illuminance of the back light and a display luminance of the both duty drive fluorescent display tubes are adjusted synchronously with each each other by the illumination control operation conducted after the back light is turned on; a grid signal line to output a grid signal to control an llumination, to the duty drive fluorescent display tube; and an OR circuit which connects a blank input terminal of the static VFD drive IC with the grid signal line, in which OR of a plurality of the grid signals is provided to form a blank input signal.

The mode of operation will be explained below.

When the illumination control operation is conducted after the light switch for the back light has been turned on, the illuminance of the back light and the display luminance of the fluorescent display tubes of duty drive and static drive are adjusted synchronously with each other.

The display luminance of both fluorescent display tubes is adjusted as follows. The display luminance of the duty drive fluorescent display tube is adjusted by a grid signal generated by an illumination control signal inputted only onto the duty VFD drive IC side. The display luminance of the static drive fluorescent display tube is adjusted by a blank input signal of the static VFD drive IC which is OR of a plurality of grid signals subjected to illumination control.

As described above, while OR of the plurality of grid signals expressing the luminance of the duty drive fluorescent display tube is made to be a blank input signal of the static VFD drive IC, the luminance of the static drive fluorescent display tube is adjusted. In other words, the display luminances of both fluorescent display tubes are adjusted synchronously with each other irrespective of the illumination control characteristic and the temperature characteristic of the static VFD drive IC.

As a result, the illumination control characteristics can be unified by the duty VFD drive IC. Accordingly, the luminances of both fluorescent display tubes can be easily adjusted. Further, the occurrence of difference of luminance caused by a change in temperature can be suppressed.

According to a thid aspect of the invention, there is provided an operating section display unit of an air conditioning system for vehicle use comprising: a duty drive fluorescent display tube arranged in an operating section of an air conditioning system for vehicle use; a static drive fluorescent display tube arranged at a position adjacent to the operating section; a duty VFD drive IC to drive a grid and segment of the duty drive fluorescent display tube; a static VFD drive IC to drive a segment of the static drive fluorescent display tube; illumination control means for outputting an illumination control signal of which frequency is determined by an oscillator, and an amplitude of which is changed in accordance with an illumination control operation, the illumination control signal being inputted only into a duty VFD drive IC side, wherein a display luminance of the both duty drive fluorescent display tubes are adjusted synchronously with each each other by the illumination control operation conducted after the back light is turned on; a grid signal line to output a grid signal to control an llumination, to the duty drive fluorescent display tube; an OR circuit which connects a blank input terminal of the static VFD drive IC with the grid signal line, in which OR of a plurality of the grid signals is provided to form a blank input signal; and an alternating current type AC filament circuit to drive a filament of the static drive fluorescent display tube, the blank signal being inputted into the AC filament circuit as a tuning signal.

When the duty drive fluorescent display tube and the static drive fluorescent display tube are simultaneously used, OR of the first grid output signal and the second one is taken, wherein both output signals are subjected to illumination control by the duty VFD drive IC. The thus taken OR is inputted into the blank input terminal of the static VFD drive IC, and the static VFD drive IC is subjected to illumination control. In this case, when the filament of the static drive fluorescent display tube is driven by an alternating current type AC filament circuit, beats are generated between the filament drive signal and the blank input signal. Therefore, beats are also generated on the static drive fluorescent display. Due to the foregoing, this static drive fluorescent display is of no value when it is put into practical use.

However, a blank input signal sent from the OR circuit is inputted into the AC filament circuit so as to be used as a tuning signal. Therefore, in the AC filament circuit, a signal tuning operation is conducted between the blank input signal and the filament drive signal so that a filament drive signal is forcibly made to be ON in the case where the blank input signal is ON and a filament drive signal is used in a normal condition in the case where the blank input signal is OFF. In this way, generation of beats on the static drive fluorescent display is prevented.

BRIEF DESCRIPTION OF THE DRAWINGS

In the accompanying drawings:

FIGS. 3(a) to 3(g) are schematic illustrations showing a wave-form of each signal in the illumination control circuit of the operating section display unit of an air conditioning system for vehicle use of the first embodiment;

FIG. 5 is a block diagram showing a primary portion of the operating section display unit of an air conditioning system for vehicle use of the second embodiment;

FIGS. 6(a) to 6(c) are views showing a wave-form of each signal in the OR circuit of the operating section display unit of an air conditioning system for vehicle use of the second embodiment;

FIGS. 10(a) and 10(b) are views showing wave-forms of the blank input signal and the filament drive signal of the operating section display unit of an air conditioning system for vehicle use of the fourth embodiment;

FIG. 11 is a block diagram of the operating section display unit of an air conditioning system for vehicle use of a fifth embodiment;

DETAILED DESCRIPTION OF THE PREFERRED EMBODIMENTS

1st Embodiment

The construction of a first embodiment will be explained below.

Figure 1:
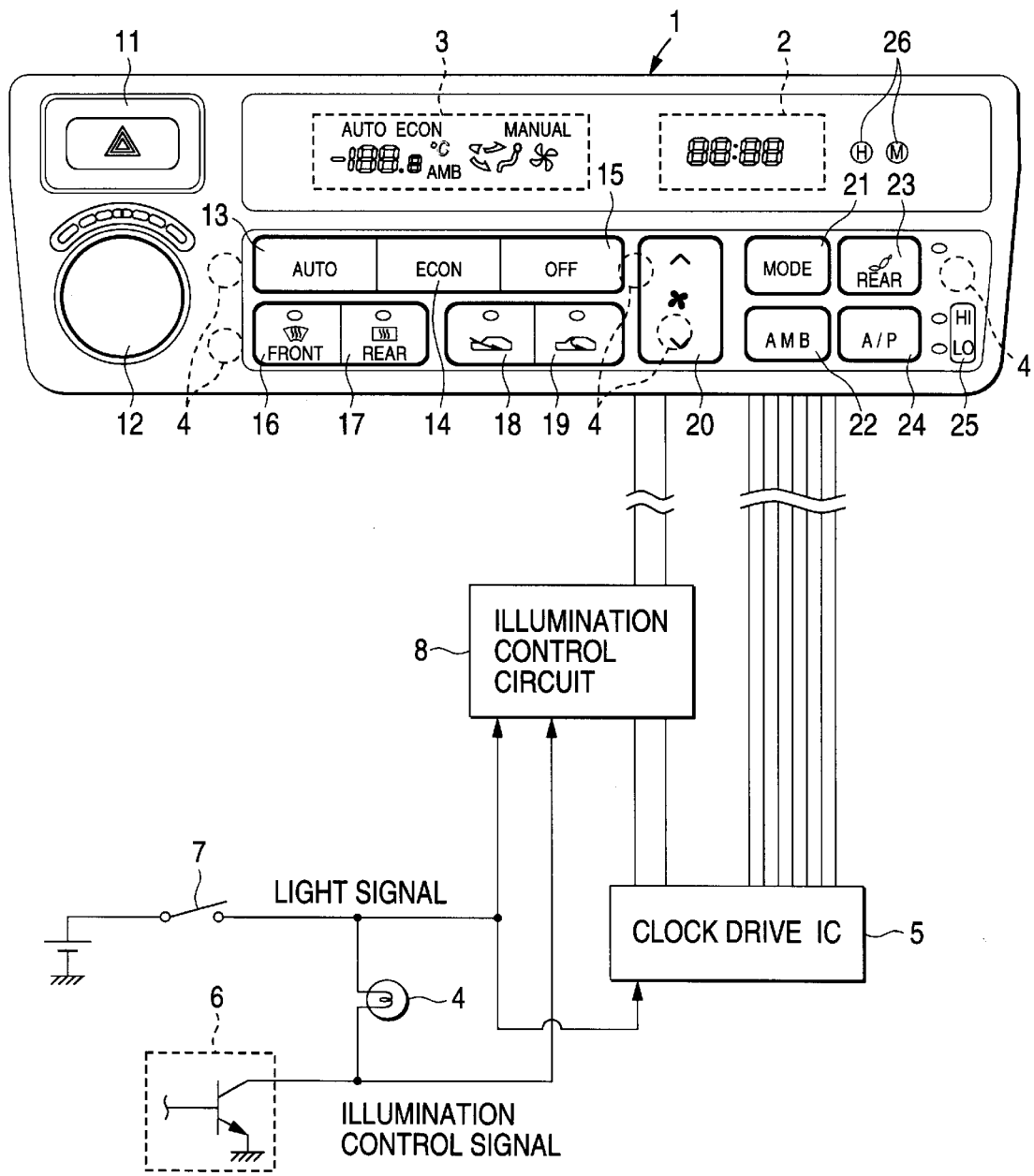
FIG. 1 is an overall arrangement view of the operating section display unit of an air conditioning system for vehicle use of a first embodiment.
Figure 2:
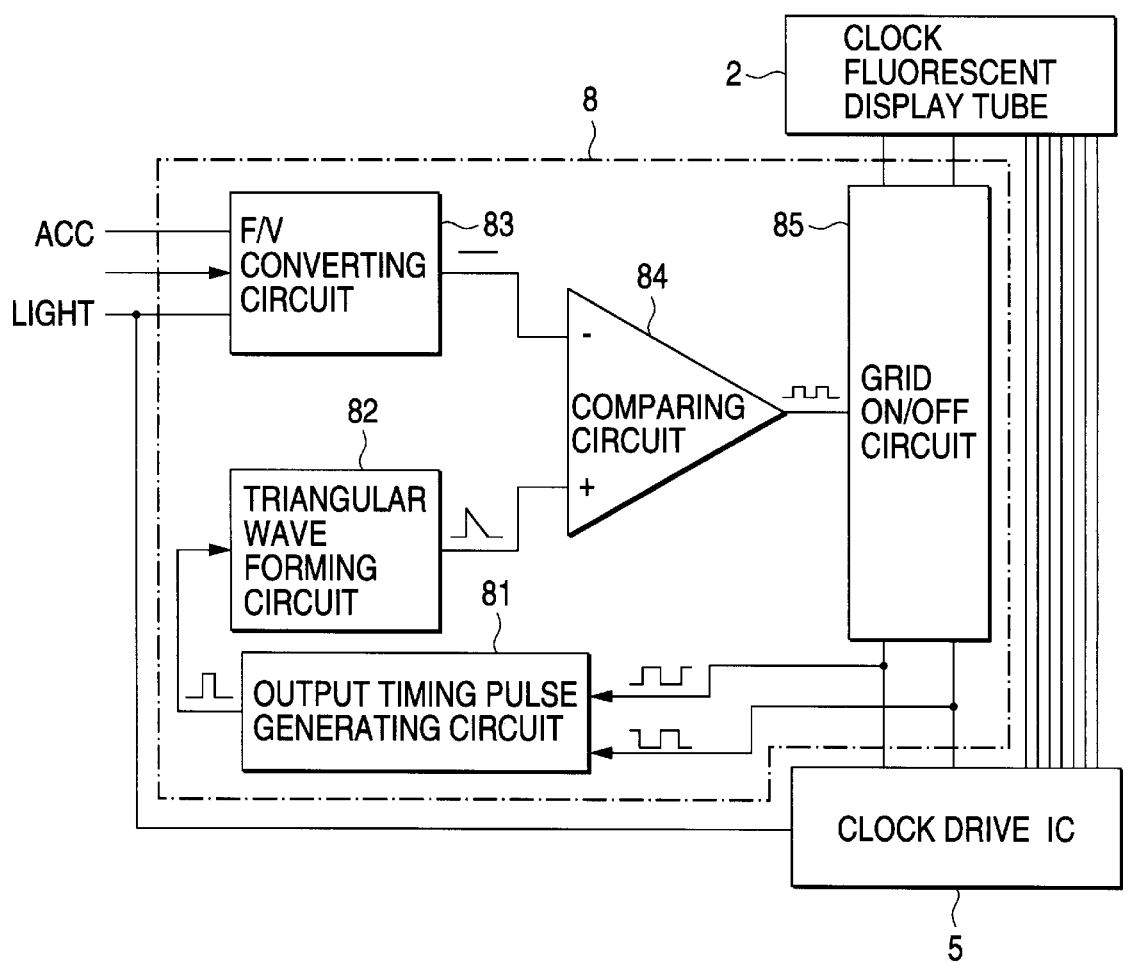
FIG. 2 is a block diagram of the illumination control circuit of the operating section display unit of an air conditioning system for vehicle use of the first embodiment.

FIG. 1 is an overall arrangement view of the operating section display unit of an air conditioning system for vehicle use. FIG. 2 is a block diagram showing an illumination control circuit of the operating section display unit.

In FIG. 1, reference numeral 1 is an operating section, reference numeral 2 is a clock fluorescent display tube (duty drive fluorescent display tube), reference numeral 3 is an air conditioning fluorescent display tube, reference numeral 4 is a back light, reference numeral 5 is a clock drive IC (duty VFD drive IC), reference numeral 6 is a illumination controller (illumination control means), reference numeral 7 is a light switch, and reference numeral 8 is an illumination control circuit.

The operating section 1 is an operating means for operating the air conditioning system for vehicle use. In the air conditioning system, it is possible to select a fully automatic system in which a temperature change in the cabin, which is caused by a change in the temperature of outside air, a change in an amount of sunshine and a change in the number of passengers, can be detected by various sensors, and when the passenger sets a desirable temperature once, the temperature and amount of air to be blown out, the suction port and the discharge port are automatically changed over in accordance with the computation conducted by a microcomputer. Alternatively, when the automatic function is not used, the amount of air to be blown out, the suction port and the discharge port may be manually changed over. Alternatively, while the automatic function is activated, specific items may be manually selected. In order to operate the system as described above, the operating section 1 includes a large number of switches to operate the system, and a display section.

Concerning the above switches, there are provided a hazard switch 11, temperature adjustment dial 12, automatic switch 13, economy switch 14, off switch 15, defrosting switch 16, rear defogger switch 17, outside air introducing switch 18, inside air circulation switch 19, air volume adjusting switch 20, mode switch 21, outside air temperature switch 22, rear seat ventilation switch 23, air purifying switch 24, and air purifying fan air volume adjusting switch 25. In the display section, there are provided a clock fluorescent display tube 2 for displaying the time, and an air conditioning fluorescent display tube 3 for displaying a setting temperature and an operating condition of the air conditioner. In this connection, reference numeral 26 is an adjusting button for adjusting a clock by which hour (H) and minute (M) can be adjusted.

The clock fluorescent display tube 2 is arranged in the display section in the operating section 1 and driven by ½ duty drive. The clock fluorescent display tube 2 displays a numeral by which time can be expressed by the radiation of a fluorescent body.

The air conditioning fluorescent display tube 3 is arranged at a position adjacent to the clock fluorescent display tube 2 of the display section of the operating section 1. By the radiation of the fluorescent body, the setting temperature and the operating condition of the air conditioner are displayed by a static drive.

There are provided five back lights 4 on the reverse side of the operating section 1. Concerning the back light 4 shown in the circuit diagram on the lower side of FIG. 1, four back lights out of five are omitted, and only one back light is shown.

The above clock drive IC 5 is a drive IC by which the grid and segment of the clock fluorescent display tube 2 are subjected to the ½ duty drive.

The illumination controller 6 is an operating means for outputting an illumination control signal by a voltage lo oscillating signal having a specific frequency determined by an oscillator housed in the unit. An amplitude of the oscillating signal is changed by the illumination control operation conducted by a driver when an adjusting dial not shown and switches are operated.

The light switch 7 is a switch for turning on the back light 4 together with the head light. The light switch 7 and the illumination controller 6 are connected to this back light 4, so that the illuminance of the back light 4 can be adjusted by an illumination control signal sent from the illumination controller 6.

The illumination control circuit 8 is arranged in the middle of a grid signal line connecting the grid terminals of the clock drive IC 5 with the clock fluorescent display tube 2. In accordance with the illumination control signal, the illumination control circuit 8 converts the IC side grid signal by the ½ duty signal, into the VFD side grid signal by the pulse signal, the pulse width of which is changed according to the illumination control signal.

Referring to FIG. 2, the circuit structure of the illumination control circuit 8 will be explained in detail.

The illumination control circuit 8 includes: an output timing pulse generating circuit 81 for generating a pulse signal in accordance with the output timing of the first grid input signal and the second grid input signal (IC side grid signal); a triangular wave forming circuit 82 for forming a triangular wave at intervals of the generated pulse; an F/V conversion circuit 83 for smoothing the illumination control signal by the average voltage; a comparing circuit 84 for producing an ON/OFF signal having an ON width and an OFF width determined by the superimposition of the triangular wave signal and the smoothed signal; and a grid ON/OFF circuit 85 for generating the first grid output signal and the second grid output signal (VFD side grid signal) by the pulse signal in accordance with the IC side grid signal and the ON/OFF signal.

Next, the mode of operation will be explained below.
[Illumination Control Operation]

When the light switch 7 is turned on while no adjustment is carried out, since the illuminance of the back light 4 is set at the maximum value in the initial setting and further the display luminance of the clock fluorescent display tube 2 is set at the maximum value, the visibility of display of the clock is deteriorated when the vehicle is driven at night.

Therefore, it is necessary to conduct an illumination control operation in which the illuminance of the back light 4 is lowered so as to reduce an intensity of light, and at the same time the display luminance of the clock fluorescent display tube 2 is lowered, so that the visibility of display of the clock can be enhanced while the vehicle is driven at night.

This illumination control operation is conducted as follows. After the light switch 7 has been turned on, the illumination control operation is conducted on the illumination controller 6. An illumination control signal to be outputted is changed by the control operation, so that the illuminance of the back light 4 and the display luminance of the clock fluorescent display tube can be synchronously adjusted.

Specifically, while the driver is looking at the operating section 1, the illumination is adjusted by the driver so that the highest visibility can be obtained in a relation between the illuminance of the background of the operating section 1 by the back light 4 and the luminance of the clock fluorescent display tube 2. In this way, it is possible to ensure a higher visibility of display of the clock when the vehicle is driven at night.
[Grid Signal Converting Action]

In the above illumination control action, the illuminance of the back light 4 is adjusted directly in accordance with a change in the illumination control signal (voltage). However, the display luminance of the clock fluorescent display tube 2 is adjusted in accordance with the grid signal converting action conducted in the illumination control circuit 8 in which the IC side grid signal by the ½ duty signal outputted from the clock drive IC 5 into the clock fluorescent display tube 2 is converted into the VFD side grid signal by the pulse signal, the pulse width of which is changed in accordance with the illumination control signal.

Referring to FIGS. 3(a) to 3(g), the grid signal converting action conducted in the illumination control circuit 8 will be explained below.

First, in the output timing pulse generating circuit 81, the first grid input signal shown by in FIG. 3(a) and the second grid input signal (IC side grid signal) shown in FIG. 3(b) are inputted. Then, in accordance with the rising output timing of both signals, a pulse signal shown in FIG. 3(c) is generated.

Into the triangular wave forming circuit 82, a pulse signal is inputted from the output timing pulse generating circuit 81, so that a triangular wave signal, the pulse interval of which is generated in the circuit, is formed as shown in FIG. 3(d).

On the other hand, into the F/V conversion circuit 83, an illumination control signal sent from the illumination controller 6 is inputted which is an oscillating signal, the frequency of which is a specific value. The inputted illumination control signal is smoothed by the average voltage, so that a smoothed signal is formed as shown in FIG. 3(d).

Into the comparing circuit 84, both the smoothed signal sent from the F/V conversion circuit 83 and the triangular wave signal sent from the triangular wave forming circuit 82 are inputted. As shown in FIG. 3(d), the triangular wave signal and the smoothed signal are superimposed on each other, and an ON/OFF signal having the ON and OFF width determined by the superimposition is generated.

Into the grid ON/OFF circuit 85, the first grid input signal shown in FIG. 3(a) and the second grid input signal shown in FIG. 3(b) are inputted from the clock drive IC 5, and also the ON/OFF signal is inputted from the comparing circuit 84. Then the first grid output signal shown in FIG. 3(f) and the second grid output signal shown in FIG. 3(g) are generated, wherein the first grid output signal and the second grid output signal are generated by the pulse signal, the pulse height of which coincides with that of the grid input signal, and the pulse width of which coincides with that of the ON/OFF signal.

By this grid signal converting action, the first grid output signal and the second one, which are outputted from the illumination control circuit 8 to the clock fluorescent display tube 2, are changed in such a manner that pulse width is changed in accordance with the average voltage of the illumination control signal. Therefore, the luminance of the clock fluorescent display tube 2 is adjusted in such a manner that the luminance is decreased in the case of a narrow pulse width, and the luminance is increased in the case of a wide pulse width.

[Prevention of Sway of the Clock Fluorescent Display]

For example, when the illumination control signal is inputted into the clock drive IC 5 by means of blank input, beats are generated by the illumination control signal and the grid signal, so that the sway of display occurs on the clock fluorescent display tube 2.

On the other hand, the illumination control signal, which is an oscillating signal having a specific frequency, is inputted into the illumination control circuit 8 and used as a smoothed signal to determine the pulse width of the pulse signal in the F/V conversion circuit 83. Since the VFD side grid signal becomes a pulse signal, the frequency of which is the same as that of the IC side grid signal, and the pulse width of which is adjustable, no beats are generated between the illumination control signal and the grid signal. Accordingly, the sway of display on the clock fluorescent display tube 2 can be prevented.

[Prevention of Keen Sounds Generated by the Clock Fluorescent Display Tube]

For example, when the illumination control signal is modulated onto the high frequency side and inputted into the duty VFD drive IC by means of blank input, the VFD side grid signal becomes a high frequency signal. Therefore, keen sounds are generated by the filament of the clock fluorescent display tube 2.

On the other hand, the frequency of the VFD side grid signal inputted into the clock fluorescent display tube 2 is the same as that of the IC side grid signal outputted from the clock drive IC 5. Accordingly, there is no possibility that a signal of high frequency is superimposed on the VFD side grid signal. Therefore, no keen sounds are generated by the filament of the clock fluorescent display tube 2.

Next, the effect will be explained below.

According to the present invention, in an operating section display unit of an air conditioning system for vehicle use having an illumination control function adjusted in such a manner that the illuminance of the back light 4 is synchronized with the display luminance on the clock fluorescent display tube 2 by duty drive, in the middle of the grid signal line connecting the grid terminal of the clock drive IC with that of the clock fluorescent display tube 2, the illumination control circuit 8 is arranged. In this case, in accordance with the illumination control signal, the illumination control circuits 8 converts the first grid input signal and the second one by the ½ duty signal into the first grid output signal and the second one by the pulse signal, the pulse width of which is changed according to the illumination control signal. Since the illumination control circuit 8 is arranged in this way, it is possible to attain a fluorescent display, the visibility of which is high, while the generation of both beats and keen sounds is prevented.

The illumination control circuit 8 includes an output timing pulse generating circuit 81, triangular wave forming circuit 82, F/V converting circuit 83, comparing circuit 84, and grid ON/OFF circuit 85. Accordingly, it is possible to form an illumination control circuit 8, the circuit structure of which is so simple that the illumination control circuit 8 can be incorporated into the display unit together with the fluorescent display tubes 2, 3 and the clock drive IC 5.

The duty drive fluorescent display tube is composed of a clock fluorescent display tube 2 driven by means of ½ duty drive, and the duty VFD drive IC is composed of a clock drive IC 5 by which the clock fluorescent display tube 2 is driven by means of ½ duty drive. Therefore, it is possible to attain a clock display, the visibility of which is high, while the generation of both beats and keen sounds is prevented.

2nd Embodiment

Figure 4:
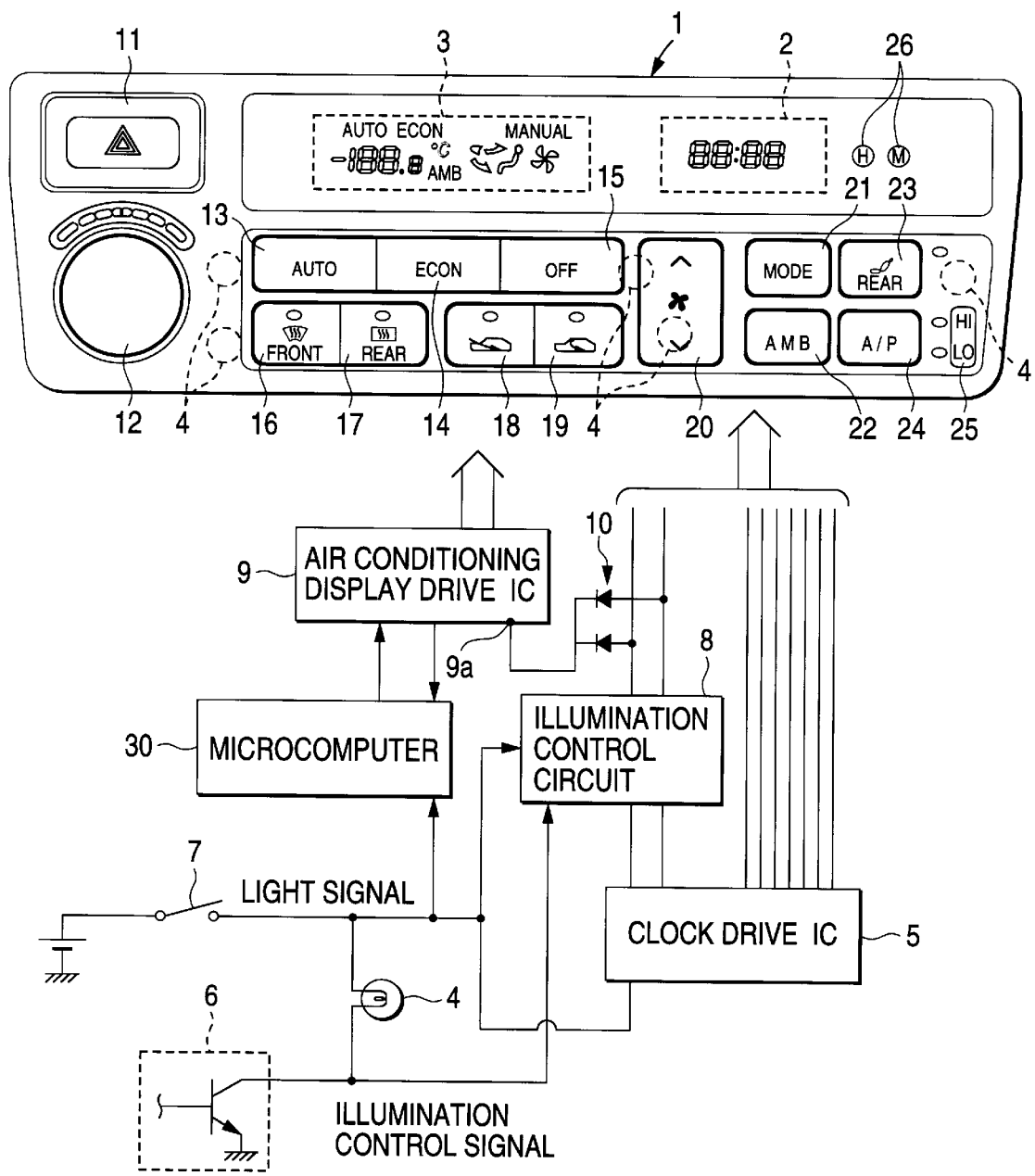
FIG. 4 is an overall arrangement view of the operating section display unit of an air conditioning system for vehicle use of a second embodiment.

FIGS. 4 and 5 show an operating section diplay unit of an air conditioning system according to a second embodiment. The construction of the operating section display unit of the second embodiment is mostly common with that of the first embodiment. However, an air conditioning display drive IC (static VFD drive IC) 9, an OR circuit 10, and a microcomputer 30 are assembled into the second embodiment.

The air conditioning display drive IC 9 is a drive IC to statically drive the segment of the air conditioning fluorescent display tube 3.

OR circuit 10 is a circuit, in which diodes are used, connected with a grid signal line to output a VFD side grid signal sent from the illumination control circuit 8 to the clock fluorescent display tube 2 and also connected with a blank input terminal 9a of the air conditioning display drive IC 9. In OR circuit 10, OR of the two VFD side grid signals is taken so that it can be used as a blank input signal.

The microcomputer 30 is an electronic control circuit in which various computation to control the air conditioning system for vehicle use is carried out in accordance with a predetermined program. The microcomputer 30 is connected to the air conditioning display drive IC 9 by a signal line so that information can be exchanged with each other.

The illumination control operation as similar to that of the first embodiment is conducted also in the second embodiment. However, in the second embodiment, not only the display luminance of the clock fluorescent display tube 2 but also the display luminance of the air conditioning fluorescent display tube 3 are adjusted in the same manner as that of the first embodiment.

Next, another mode of operation will be explained below.
[Luminance Adjustment]

In the illumination control operation, the illuminance of the back light 4 is adjusted directly corresponding to a change (a change in voltage) in the illumination control signal.

The display luminance of the clock fluorescent display tube 2 is adjusted as follows. The IC side grid signal by the ½ duty signal outputted from the clock drive IC 5 into the clock fluorescent display tube 2 is converted into a VFD side grid signal by the pulse signal, the pulse width of which is changed in accordance with the illumination control signal, and this VFD side grid signal is inputted into two grid terminals of the clock drive IC 5. That is, the luminance of the clock fluorescent display tube 2 is adjusted in such a manner that the luminance is decreased when the pulse width of the first grid output signal and the pulse width of the second one are narrow, and the luminance is increased when the pulse width of the first grid output signal and the pulse width of the second one are wide.

The display luminance of the air conditioning fluorescent display tube 3 is adjusted as follows. The first grid output signal and the second one shown in FIGS. 6(a) to 6(c) are the VFD side grid signals made by the clock drive IC and the illumination control circuit 8. OR of these signals is taken by the OR circuit 10. Thus taken OR is made to be a blank input signal shown in FIG. 6(c) of the air conditioning display drive IC 9. In the air conditioning display drive IC 9, a segment output of the air conditioning fluorescent display tube 3 is changed in accordance with the blank input signal which is a display ON/OFF signal. When the segment output of the air conditioning fluorescent display tube 3 is changed in this way, the display luminance of the air conditioning fluorescent display tube 3 can be adjusted. That is, the luminance of the air conditioning fluorescent display tube 3 is adjusted to be low when the pulse width of the blank input signal is narrow, and the luminance of the air conditioning fluorescent display tube 3 is adjusted to be high when the pulse width of the blank input signal is wide.

That is, OR of the first grid output signal and the second one expressing the luminance of the clock fluorescent display tube 2 is made to be a blank input signal of the air conditioning display drive IC 9 to adjust the luminance of the air conditioning fluorescent display tube 3. In other words, the display luminances of both fluorescent display tubes 2, 3 are adjusted synchronously with each other irrespective of the illumination control characteristic and the temperature characteristic of the air conditioning drive IC 9.

As a result, the illumination control characteristic is unified by the clock drive IC 5. Therefore, the luminance of the fluorescent display tube 2 and that of the fluorescent display tube 3 can be easily adjusted so that they can be made to coincide with each other. Further, it becomes possible to suppress the occurrence of a difference of luminance caused by a change in temperature.

Next, the effect will be explained below.

In an operating section display unit of an air conditioning system for vehicle use having an illumination control function in which the illumination of the back light 4 and the display luminance of the clock fluorescent display tube 2 of duty drive and the display luminance of the air conditioning fluorescent display tube 3 of static drive are adjusted synchronously with each other, the illumination control signal is inputted only onto the duty clock drive IC side 5, and a grid signal line to output a grid signal, by which the illumination control is conducted, to the clock fluorescent display tube 2 and a blank input terminal 9a of the air conditioning display drive IC 9 are connected to each other via an OR circuit 10 in which OR of the VFD side grid signals is provided to form a blank input signal. Therefore, the luminance of the fluorescent display tube 2 and that of the fluorescent display tube 3 can be easily adjusted so that they can be made to coincide with each other. While the occurrence of a difference of luminance caused by a change in temperature is suppressed, it is possible to attain a fluorescent display of high visibility.

The duty drive fluorescent display tube is a clock fluorescent display tube 2 of ½ duty drive, the duty VFD drive IC is a clock drive IC 5 to drive the clock fluorescent display tube 2 by means of ½ duty drive, the static drive fluorescent display tube is an air conditioning fluorescent display tube 3 by static drive, and the static VFD drive IC is an air conditioning display drive IC 9. Therefore, the luminance of the fluorescent display tube 2 and that of the fluorescent display tube 3 can be easily adjusted so that they can be made to coincide with each other. While the occurrence of a difference of luminance caused by a change in temperature is suppressed, it is possible to attain a fluorescent display of high visibility.

3rd Embodiment

Figure 7:
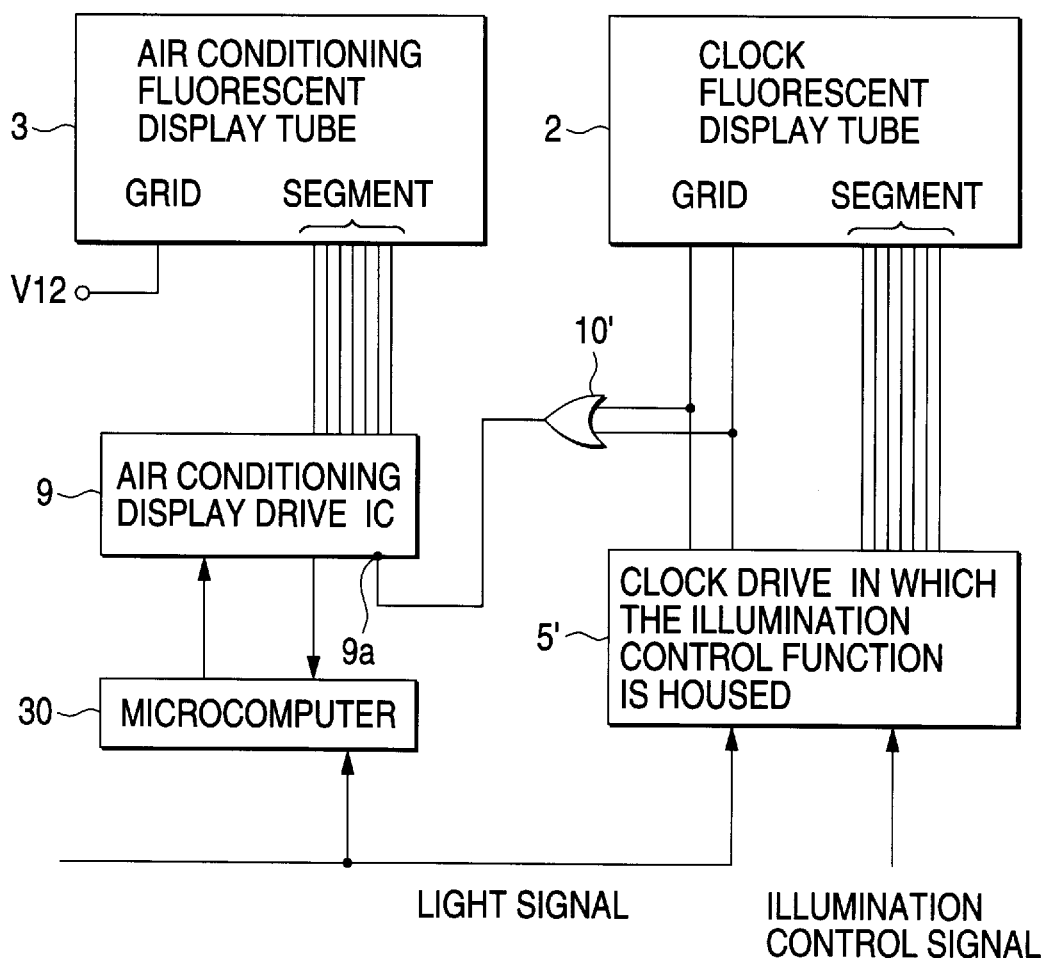
FIG. 7 is a block diagram of the operating section display unit of an air conditioning system for vehicle use of a third embodiment.

FIG. 7 shows a third embodiment of the present invention. As the clock drive IC 5, an clock drive IC 5' in which an illumination control function is housed is used. The clock drive IC 5' is operated in such a manner that an illumination control signal is inputted into the clock drive IC 5' and a grid signal to control illumination steplessly is outputted. Further, OR circuit 10' different from that of the second embodiment is used in the third embodiment.

Other points of construction of the third embodiment are the same as those of the second embodiment. Therefore, the explanations of the third embodiment are omitted here. The mode of operation of the third embodiment is the same as that of the second embodiment. Therefore, the explanations of the mode of operation of the third embodiment are omitted here.

Unlike the construction of the second embodiment, it is unnecessary to provide an illumination control circuit 8 in the third embodiment. Accordingly, it is possible to simplify the circuit structure of the second embodiment.

In the above embodiments, the static drive fluorescent display tube is an air conditioning fluorescent display tube 3, and the static VFD drive IC is an air conditioning display drive IC 9. However, it should be noted that the static drive fluorescent display tube may display the marks or characters as well as the state of air conditioning.

4th Embodiment

Figure 8:
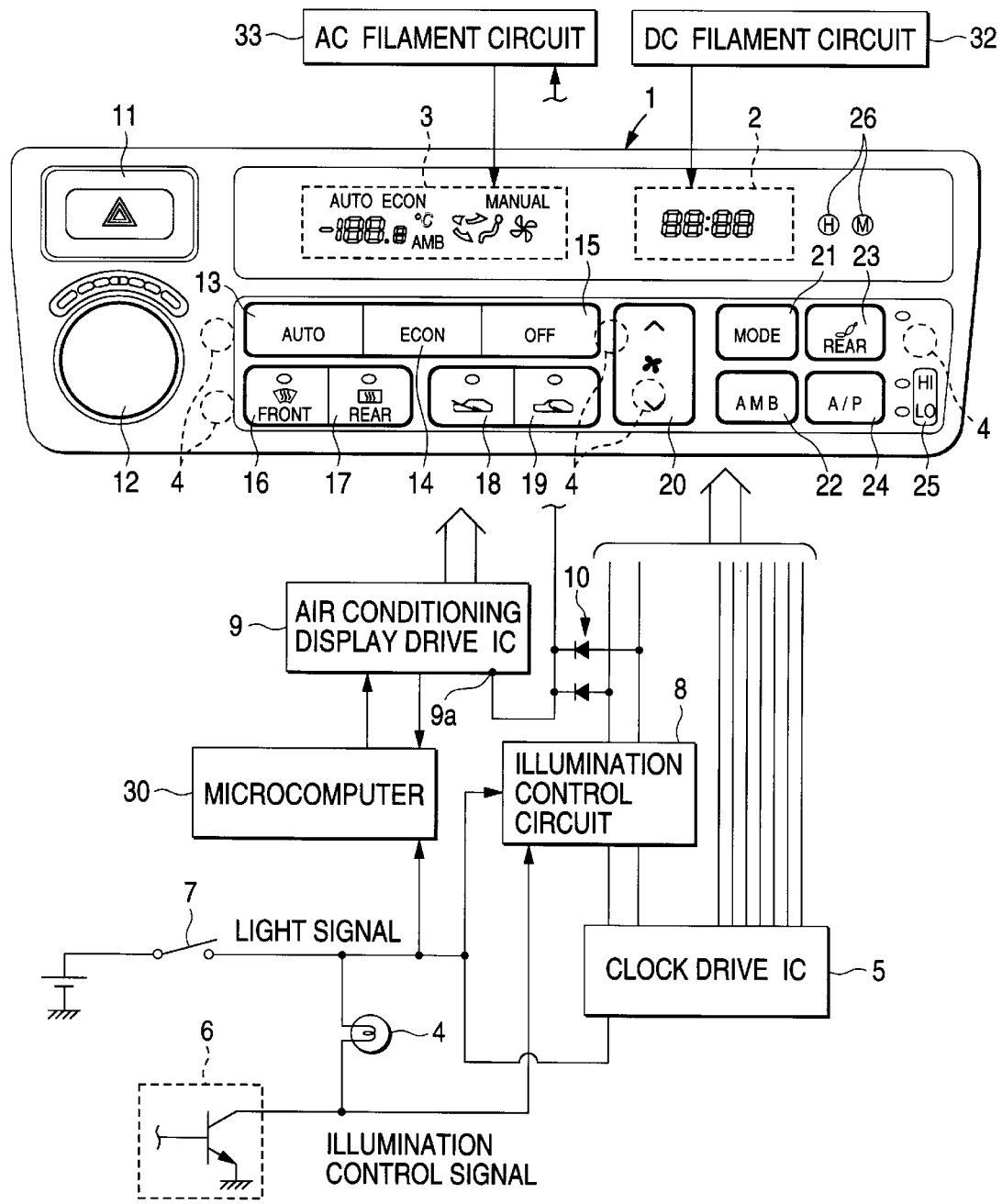
FIG. 8 is an overall arrangement view of the operating section display unit of an air conditioning system for vehicle use of a fourth embodiment.
Figure 9:
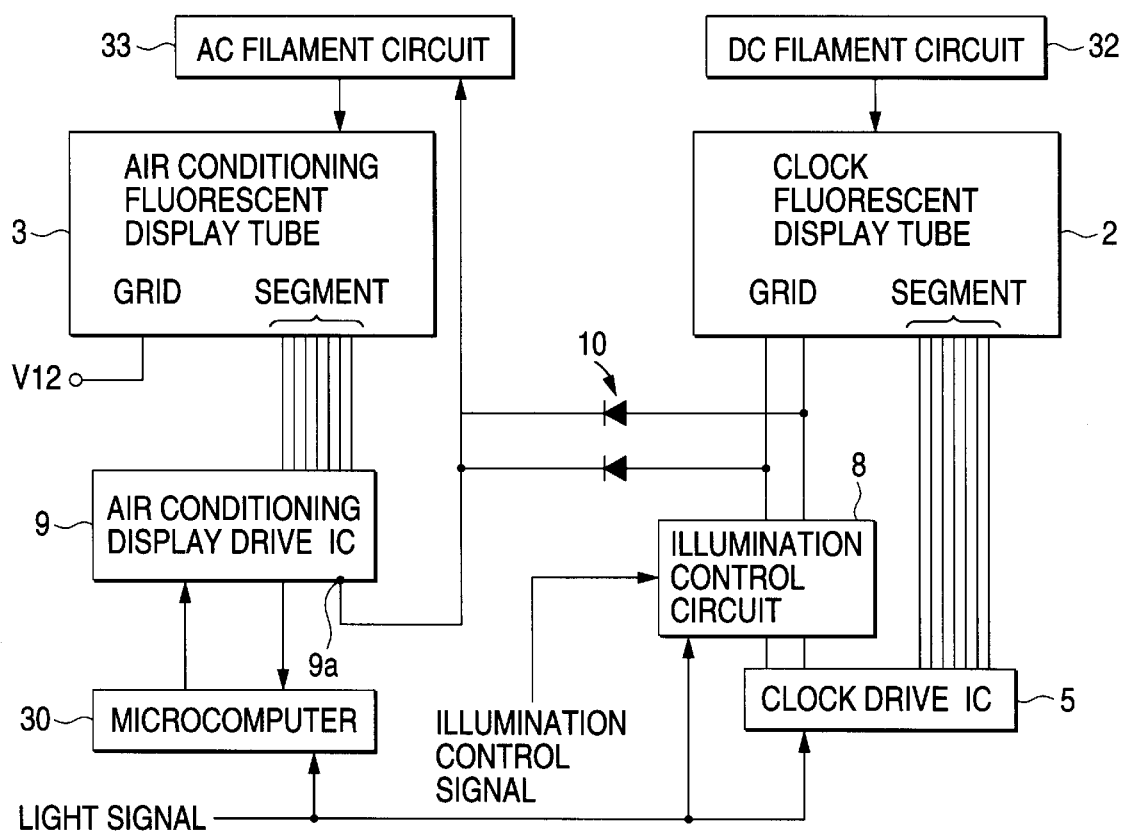
FIG. 9 is a block diagram showing a primary portion of the operating section display unit of an air conditioning system for vehicle use of the fourth embodiment.
Figure 12:
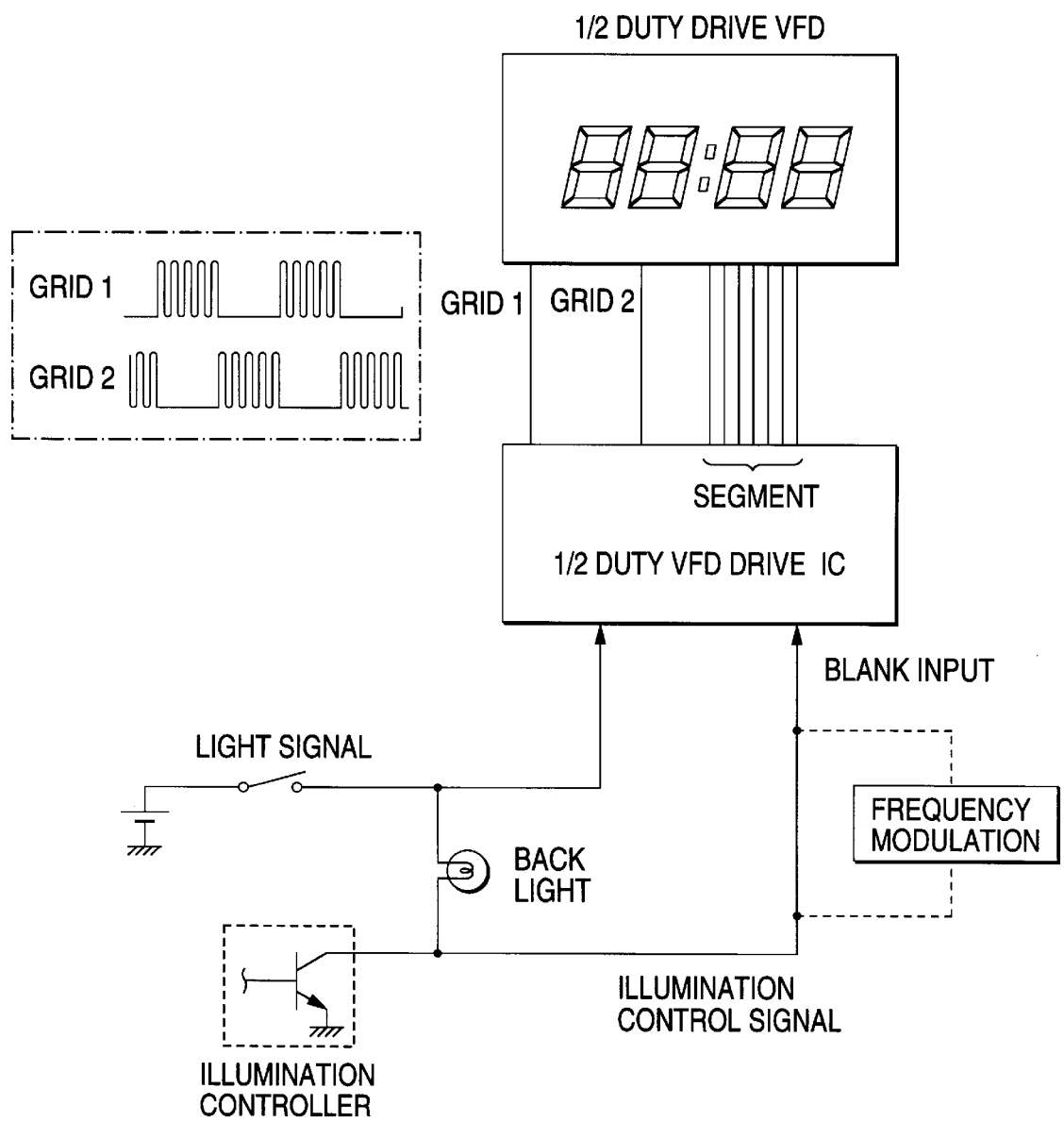
FIG. 12 is an overall arrangement view of the operating section display unit of an air conditioning system for vehicle use of the prior art.
Figure 13:
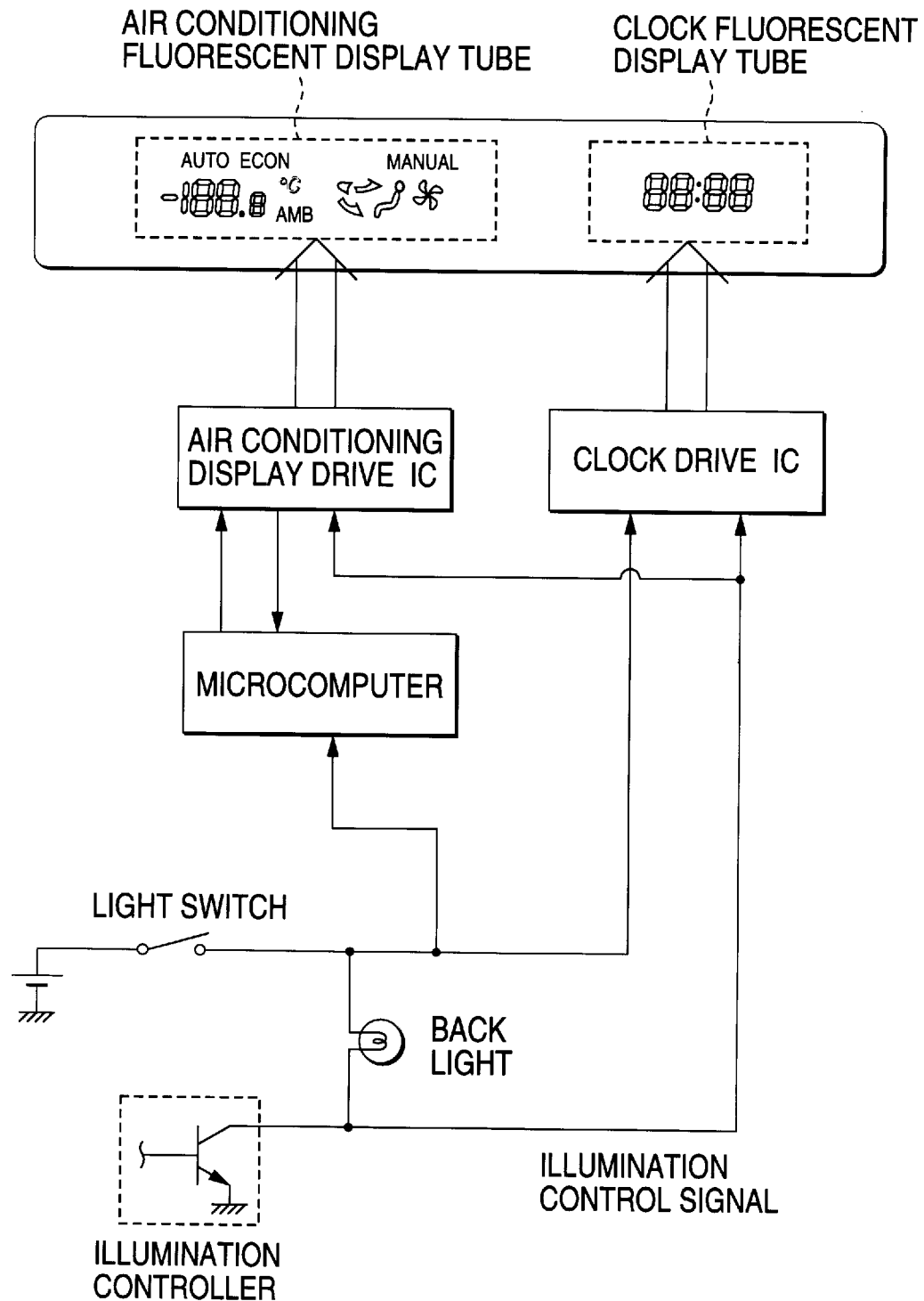
FIG. 13 is an overall arrangement view showing an operating section display unit of an air conditioning system for vehicle use of the prior art.

FIGS. 8 and 9 show an operating section diplay unit of an air conditioning system according to a fourth embodiment. The construction of the operating section diplay unit of the fourth embodiment is mostly common with that of the second embodiment. However, in the forth embodiment, a DC filament circuit 32 and an AC filament circuit 33 are clearly illustrated. Of course, such filaments are necessary in the second embodiment, but they are omitted therein.

The DC filament circuit 32 is a direct current type filament circuit to drive a filament of the clock fluorescent display tube 2, and the AC filament circuit 33 is an alternating current type filament circuit to drive a filament of the air conditioning fluorescent display tube 3. Into the AC filament circuit 33, a blank input signal sent from the OR circuit 10 is inputted as a grid tuning signal.

The operating section diplay unit has the same functions as that of the aforemenioned embodiments. And the additional function will be explained below.

[Prevention of Beats on the Air Conditioning Fluorescent Display]

When the duty drive fluorescent display tube and the static drive fluorescent display tube are simultaneously used, OR of the first grid output signal and the second one is taken, wherein both output signals are subjected to illumination control by the duty VFD drive IC. The thus taken OR is inputted into the blank input terminal of the static VFD drive IC, and the static VFD drive IC is subjected to illumination control. In this case, when the filament of the static drive fluorescent display tube is driven by an alternating current type AC filament circuit, beats are generated between the filament drive signal and the blank input signal. Therefore, beats are also generated on the static drive fluorescent display. Due to the foregoing, this static drive fluorescent display is of no value when it is put into practical use.

Since the filament drive signal and the blank input signal are not in a tuning relation to each other, the following two cases repeatedly occur. One is a case in which the filament drive signal becomes ON when the blank input signal is ON, so that the display luminance on the static drive fluorescent display tube can be maintained. The other is a case in which the filament drive signal becomes OFF although the blank input signal is ON as illustrated by in FIG. 10(a), so that the display luminance on the static drive fluorescent display tube is lowered without accelerating electrons.

However, in the fourth embodiment of the present invention, a blank input signal sent from the OR circuit 10 is inputted into the AC filament circuit 33 as a grid tuning signal shown in FIG. 6(c). Therefore, as shown in FIG. 10(b), the blank input signal is synchronized with the filament drive signal so that the filament drive signal can be synchronized in the AC filament circuit 33 while a rise of the blank input signal is used as a trigger and so that the filament drive signal can be a normal drive signal when the blank input signal is OFF. In this way, the occurrence of beats by which the display luminance on the air conditioning fluorescent display fluctuates can be prevented.

5th Embodiment

FIG. 11 shows a fifth embodiment of the present invention. As the clock drive IC 5, an clock drive IC 5' in which an illumination control function is housed is used. The clock drive IC 5' is operated in such a manner that an illumination control signal is inputted into the clock drive IC 5' and a grid signal to control illumination steplessly is outputted. Further, OR circuit 10' different from that of the fourth embodiment is used in the fifth embodiment.

Other points of construction of the third embodiment are the same as those of the second embodiment. Therefore, the explanations of the fifth embodiment are omitted here. The mode of operation of the fifth embodiment is the same as that of the fourth embodiment. Therefore, the explanations of the mode of operation of the fifth embodiment are omitted here.

Next, several kinds of modifications for the aforementioned embodiments will be described below.

In the above embodiments, the duty drive fluorescent display tube is composed of a clock fluorescent display tube 2 driven by means of ½ duty drive, and the duty VFD drive IC is composed of a clock drive IC 5 by which the clock fluorescent display tube 2 is driven by means of ½ duty drive. However, it should be noted that the present invention is not limited to the specific embodiment of ½ duty drive, but ⅓ duty drive and ¼ duty drive may be adopted. Also, it is possible to adopt a duty drive fluorescent display tube on which marks and characters are displayed instead of the clock.

In the first embodiment, in the illumination control circuit 8, the illumination control signal is made to be a smoothed signal and superimposed on a triangular wave, so that the pulse width can be determined. However, as long as the circuit structure is composed in such a manner that the pulse width is determined in accordance with the average voltage level of the illumination control signal, any circuit structure except for the circuit structure shown in first embodiment may be adopted.

In the second to fifth embodiments, the static drive fluorescent display tube is an air conditioning fluorescent display tube 3, and the static VFD drive IC is an air conditioning display drive IC 9. However, it should be noted that the static drive fluorescent display tube may display the marks or characters as well as the static of air conditioning.

Next, effects of the present invention will be described below.

The operating section display unit of an air conditioning system for vehicle use has an illumination control function adjusted in such a manner that the illuminance of the back light is synchronized with the display luminance on the duty drive fluorescent display tube, in the middle of the grid signal wire connecting the grid terminal of the duty VFD drive IC with that of the duty drive fluorescent display tube, the illumination control circuit is arranged. In the above structure, in accordance with the illumination control signal, the illumination control circuits converts the IC side grid signal by the duty signal into the VFD side grid signal by the pulse signal, the pulse width of which is changed in accordance with the illumination control signal. Since the illumination control circuit is arranged in this way, it is possible to attain a fluorescent display, the visibility of which is high, while the generation of both beats and keen sounds is prevented.

The illumination control circuit may include: an output timing pulse generating circuit for generating a pulse in accordance with an output timing of the IC side grid signal; a triangular wave forming circuit for forming a triangular wave at an interval of the generated pulses; an F/V converting circuit for smoothing an illumination control signal by an average voltage; a comparison circuit for making an ON/OFF signal having an ON width and an OFF width determined by superimposing a triangle signal and a smoothed signal; and a grid ON/OFF circuit for generating a VFD side gird signal according to a pulse signal by the IC side grid signal and the ON/OFF signal. Accordingly, it is possible to provide the above effects by forming an illumination control circuit, the circuit structure of which is so simple that the illumination control circuit can be incorporated into the display unit together with the fluorescent display tubes and the clock drive IC.

The duty drive fluorescent display tube may be a clock fluorescent display tube by ½ duty drive, and the duty VFD drive IC is a clock drive IC in which a clock fluorescent display tube is subjected to ½ duty drive. Since the illumination control circuit is arranged in this way, it is possible to attain a fluorescent display, the visibility of which is high, while the generation of both beats and keen sounds is prevented.

In an operating section display unit of an air conditioning system for vehicle use having an illumination control function in which the illumination of the back light and the display luminance of the fluorescent display tubes of duty drive and static drive are adjusted synchronously with each other, the illumination control signal is inputted only onto the VFD drive IC side, and a grid signal line to output a grid signal, by which the illumination control is conducted, to the duty fluorescent display tube and a blank input terminal of the static VFD drive IC are connected to each other via an OR circuit in which OR of a plurality of grid signals is provided to form a blank input signal. Therefore, the luminance of both fluorescent display tubes can be easily adjusted so that they can be made to coincide with each other. While the occurrence of a difference of luminance caused by a change in temperature is suppressed, it is possible to attain a fluorescent display of high visibility.

The duty VFD drive IC in which an illumination control function may be housed is used as the duty VFD drive IC. The duty VFD drive IC is operated in such a manner that an illumination control signal is inputted into the duty VFD drive IC and a grid signal to control illumination steplessly is outputted. Therefore, although the circuit structure is simple in which the illumination control circuit is unnecessary, it is possible to provide the effect of the invention described above.

The illumination control signal is inputted only onto the VFD drive IC side, and a grid signal line to output a grid signal, by which the illumination control is conducted, to the duty fluorescent display tube and a blank input terminal of the static VFD drive IC are connected to each other via an OR circuit in which OR of a plurality of grid signals is provided to form a blank input signal, and at the same time the blank input signal is inputted into the AC filament circuit as a grid tuning signal. Therefore, the luminance of both fluorescent display tubes can be easily adjusted so that they can be made to coincide with each other. While the occurrence of a difference of luminance caused by a change in temperature is suppressed, and also while the occurrence of beats on the static drive fluorescent display is suppressed, it is possible to attain a fluorescent display of high visibility.

What is claimed is:

1. An operating section display unit of an air conditioning system for vehicle use comprising:

a duty drive fluorescent display tube arranged in an operating section of an air conditioning system for vehicle use, said duty drive fluorescent display tube displaying a numeral, character or mark by radiation of a fluorescent body;

a back light arranged on a reverse side of said operating section;

a duty VFD drive IC to drive a grid and segment of said duty drive fluorescent display tube;

illumination control means for outputting an illumination control signal of which frequency is determined by an oscillator, and an amplitude of which is changed in accordance with an illumination control operation, wherein an illuminance of said back light and a display luminance of said duty drive fluorescent display tube are adjusted synchronously with each each other by the illumination control operation conducted after said back light is turned on; and an illumination control circuit for converting an IC side grid signal according to a duty signal into a VFD side grid signal according to a pulse signal, a pulse width of the VFD side grid signal being changed in accordance with the illumination control signal, said illumination control circuit being arranged between said duty VFD drive IC and said duty drive fluorescent display tube.

2. The operating section display unit of an air conditioning system for vehicle use according to claim 1, wherein said illumination control circuit includes:

an output timing pulse generating circuit for generating a pulse in accordance with an output timing of the IC side grid signal;

a triangular wave forming circuit for forming a triangular wave at an interval of the pulses generated by said output timing pulse generating circuit;

an F/V converting circuit for smoothing the illumination control signal by an average voltage;

a comparison circuit for making an ON/OFF signal having an ON width and an OFF width determined by superimposing a triangle signal and a smoothed signal; and a grid ON/OFF circuit for generating a VFD side grid signal according to a pulse signal by the IC side grid signal and the ON/OFF signal.

3. The operating section display unit of an air conditioning system for vehicle use according to claim 2, wherein said duty drive fluorescent display tube is a clock fluorescent display tube by ½ duty drive, and said duty VFD drive IC is a clock drive IC in which a clock fluorescent display tube is subjected to ½ duty drive.

4. The operating section display unit of an air conditioning system for vehicle use according to claim 1, wherein said duty drive fluorescent display tube is a clock fluorescent display tube by ½ duty drive, and said duty VFD drive IC is a clock drive IC in which a clock fluorescent display tube is subjected to ½ duty drive.

5. An operating section display unit of an air conditioning system for vehicle use comprising:

a duty drive fluorescent display tube arranged in an operating section of an air conditioning system for vehicle use;

a static drive fluorescent display tube arranged at a position adjacent to said duty drive fluorescent display tube;

a back light arranged on a reverse side of said operating section;

a duty VFD drive IC to drive a grid and segment of said duty drive fluorescent display tube;

a static VFD drive IC to drive a segment of said static drive fluorescent display tube;

illumination control means for outputting an illumination control signal of which frequency is determined by an oscillator, and an amplitude of which is changed in accordance with an illumination control operation, the illumination control signal being inputted only into a duty VFD drive IC side, wherein an illuminance of said back light and a display luminance of said both duty drive fluorescent display tubes are adjusted synchronously with each each other by the illumination control operation conducted after said back light is turned on;

a grid signal line to output a grid signal to control an llumination, to said duty drive fluorescent display tube; and an OR circuit which connects a blank input terminal of said static VFD drive IC with said grid signal line, in which OR of a plurality of the grid signals is provided to form a blank input signal.

6. The operating section display unit of an air conditioning system for vehicle use according to claim 5, further comprising an illumination control circuit for converting an IC side grid signal by a duty signal into a VFD side grid signal by a pulse signal, a pulse width of the VHD side grid signal is changed in accordance with the illumination control signal, and said illumination control circuit is arranged in a middle of said grid signal line for connecting a grid terminal of said duty VFD drive IC with a grid terminal of said duty drive fluorescent display tube.

7. The operating section display unit of an air conditioning system for vehicle use according to claim 6, wherein said duty drive fluorescent display tube is a clock fluorescent display tube of ½ duty drive, said duty VFD drive IC is a clock drive IC, said static drive fluorescent display tube is an air conditioning fluorescent display tube by static drive, and said static VFD drive IC is an air conditioning display drive IC.

8. The operating section display unit of an air conditioning system for vehicle use according to claim 5, wherein said duty drive fluorescent display tube is a clock fluorescent display tube of ½ duty drive, said duty VFD drive IC is a clock drive IC, said static drive fluorescent display tube is an air conditioning fluorescent display tube by static drive, and said static VFD drive IC is an air conditioning display drive IC.

9. The operating section display unit of an air conditioning system for vehicle use according to claim 5, wherein said duty VFD drive IC has a stepless illumination control function to output the grid signal to control the illumination when the illumination control signal is inputted.

10. The operating section display unit of an air conditioning system for vehicle use according to claim 9, wherein said duty drive fluorescent display tube is a clock fluorescent display tube of ½ duty drive, said duty VFD drive IC is a clock drive IC, said static drive fluorescent display tube is an air conditioning fluorescent display tube by static drive, and said static VFD drive IC is an air conditioning display drive IC.

11. The operating section display unit of an air conditioning system for vehicle use according to claim 5, further comprising an alternating current type AC filament circuit to drive a filament of said static drive fluorescent display tube, and the blank signal is inputted into said AC filament circuit as a tuning signal.

12. An operating section display unit of an air conditioning system for vehicle use comprising:

a duty drive fluorescent display tube arranged in an operating section of an air conditioning system for vehicle use;

a static drive fluorescent display tube arranged at a position adjacent to said duty drive fluorescent display tube;

a duty VFD drive IC to drive a grid and segment of said duty drive fluorescent display tube;

a static VFD drive IC to drive a segment of said static drive fluorescent display tube;

illumination control means for outputting an illumination control signal of which frequency is determined by an oscillator, and an amplitude of which is changed in accordance with an illumination control operation, the illumination control signal being inputted only into a duty VFD drive IC side, wherein a display luminance of said both duty drive fluorescent display tubes are adjusted synchronously with each each other by the illumination control operation conducted;

a grid signal line to output a grid signal to control an llumination, to said duty drive fluorescent display tube;

an OR circuit which connects a blank input terminal of said static VFD drive IC with said grid signal line, in which OR of a plurality of said grid signals is provided to form a blank input signal; and an alternating current type AC filament circuit to drive a filament of said static drive fluorescent display tube, the blank signal being inputted into said AC filament circuit as a tuning signal.

13. The operating section display unit of an air conditioning system for vehicle use according to claim 12, further comprising an illumination control circuit for converting an IC side grid signal by a duty signal into a VFD side grid signal by a pulse signal, a pulse width of the VHD side grid signal is changed in accordance with the illumination control signal, and said illumination control circuit is arranged in a middle of said grid signal line for connecting a grid terminal of said duty VFD drive IC with a grid terminal of said duty drive fluorescent display tube.

14. The operating section display unit of an air conditioning system for vehicle use according to claim 13, wherein said duty drive fluorescent display tube is a clock fluorescent display tube of ½ duty drive, said duty VFD drive IC is a clock drive IC, said static drive fluorescent display tube is an air conditioning fluorescent display tube by static drive, and said static VFD drive IC is an air conditioning display drive IC.

15. The operating section display unit of an air conditioning system for vehicle use according to claim 12, wherein said duty drive fluorescent display tube is a clock fluorescent display tube of ½ duty drive, said duty VFD drive IC is a clock drive IC, said static drive fluorescent display tube is an air conditioning fluorescent display tube by static drive, and said static VFD drive IC is an air conditioning display drive IC.

16. The operating section display unit of an air conditioning system for vehicle use according to claim 12, wherein said duty VFD drive IC has a stepless illumination control function to output the grid signal to control the illumination when the illumination control signal is inputted.

17. The operating section display unit of an air conditioning system for vehicle use according to claim 16, wherein said duty drive fluorescent display tube is a clock fluorescent display tube of ½ duty drive, said duty VFD drive IC is a clock drive IC, said static drive fluorescent display tube is an air conditioning fluorescent display tube by static drive, and said static VFD drive IC is an air conditioning display drive IC.

* * * * *